(12) United States Patent
Albrecht et al.

(10) Patent No.: US 11,346,644 B2
(45) Date of Patent: May 31, 2022

(54) PLUG GAUGE AND ASSOCIATED METHOD FOR SEALING THE SAME

(71) Applicant: The Boeing Company, Chicago, IL (US)

(72) Inventors: Mark Albrecht, Lake Stevens, WA (US); Kwok Tung Chan, Seattle, WA (US); Gary Backhaus, Lake Stevens, WA (US)

(73) Assignee: The Boeing Company, Chicago, IL (US)

( * ) Notice: Subject to any disclaimer, the term of this patent is extended or adjusted under 35 U.S.C. 154(b) by 756 days.

(21) Appl. No.: 16/293,866

(22) Filed: Mar. 6, 2019

(65) Prior Publication Data

US 2020/0284571 A1  Sep. 10, 2020

(51) Int. Cl.
*G01B 3/26* (2006.01)
*G01B 5/12* (2006.01)
(Continued)

(52) U.S. Cl.
CPC ............ *G01B 3/26* (2013.01); *F16J 15/3252* (2013.01); *F16J 15/3268* (2013.01); *F16J 15/3284* (2013.01); *G01B 5/12* (2013.01)

(58) Field of Classification Search
CPC .... F16J 15/00; F16J 15/16; F16J 15/50; F16J 15/52; F16J 15/32; F16J 15/3204; F16J 15/3248; F16J 15/3252; F16J 15/3256; F16J 15/326; F16J 15/3264; F16J 15/3268; F16J 15/3272; F16J 15/3284; F16J 15/3288; F16J 15/3292; G01B 3/00; G01B 3/26; G01B 5/00; G01B 5/12
(Continued)

(56) References Cited

U.S. PATENT DOCUMENTS 2,799,092 A * 7/1957 Abramson ............... G01B 5/12
                                                    33/542
4,170,831 A * 10/1979 Olasz ...................... G01B 3/26
                                                    33/794
(Continued)

FOREIGN PATENT DOCUMENTS

EP  0 699 294  3/1996
EP  3 037 193  6/2016
(Continued)

OTHER PUBLICATIONS

European Patent Office, Extended European Search Report, App. No. 20159269.8 (dated Jul. 15, 2020).
(Continued)

*Primary Examiner* — Nathan Gumar
(74) *Attorney, Agent, or Firm* — Walters & Wasylyna LLC (57) ABSTRACT

A plug gauge includes a housing defining an internal volume and a longitudinal axis AH. The housing includes an opening into the internal volume. The plug gauge also includes a contact element at least partially received in the opening. The plug gauge further includes a plunger at least partially received in the internal volume. The plunger is biased into engagement with the contact element to urge the contact element radially outward from the housing through the opening. The plug gauge additionally includes a sealing member between the contact element and the housing.

20 Claims, 10 Drawing Sheets

(51) Int. Cl.
*F16J 15/3268* (2016.01)
*F16J 15/3284* (2016.01)
*F16J 15/3252* (2016.01)

(58) Field of Classification Search
USPC .................................................. 33/501.45
See application file for complete search history.

(56) References Cited

U.S. PATENT DOCUMENTS

| | | | | |
|---|---|---|---|---|
| 10,323,474 | B2* | 6/2019 | Olsen | ................... E21B 21/001 |
| 2014/0090888 | A1* | 4/2014 | Smith | ..................... E21B 21/08 |
| | | | | 175/38 |
| 2019/0032471 | A1* | 1/2019 | Puls | ...................... G01L 5/0085 |
| 2020/0333126 | A1* | 10/2020 | Albrecht | .................. G01B 5/12 |

FOREIGN PATENT DOCUMENTS

| | | |
|---|---|---|
| GB | 1 556 458 | 11/1979 |
| WO | WO 2010/060974 | 6/2010 |

OTHER PUBLICATIONS

European Patent Office, "Communication pursuant to Article 94(3) EPC," App. No. 20 159 268.8 (dated Nov. 4, 2021).
Capacitec, "Non-contact Capacitive Hole Diameter Sensor Probes," https://www.capacitec.com/Products/Hole-Measuring-Systems/Hole-Diameter-Probes (2019).
Willrich Precision Instrument, "Mahr Federal Dimentron Plug," https://willrich.com/ (2019).
Diatest, "BMD—Plug Gauge," http:www.diatest.com/products/solutions-for-gauging/measurement-of-diameter-and-length (2019).

* cited by examiner

PLUG GAUGE AND ASSOCIATED METHOD FOR SEALING THE SAME

FIELD

This application relates to bore metrology and, more particularly, to sealed plug gauges and associated methods for inhibiting the ingress of debris into plug gauges.

BACKGROUND

There are a variety of measuring tools used for determining the diameter of a cylindrical bore. Measuring tools of this type normally include a device that functions by contacting diametrically opposite points within the bore. An example of measuring tools of this type includes a plug gauge. A typical plug gauge includes a central housing having a pair of angularly disposed spring-loaded contacts, one contact on either side of a centerline disposed perpendicular to a longitudinal axis of the housing, and a plunger that is coupled to the contacts and positioned along the longitudinal axis. When the housing is inserted within a bore, motion of the contacts along the centerline is transferred to motion of the plunger along the longitudinal axis. A measuring tool, such as a dial gauge, is operably coupled to the plunger to measure the linear displacement of the plunger. Typically, the contacts project through openings in the housing. These openings allow debris and other contaminants located within the bore to enter the housing. Such debris can negatively effect the operation and accuracy of the plug gauge. Accordingly, those skilled in the art continue with research and development efforts in the field of internal bore measuring devices and, as such, apparatuses and methods, intended to address the above-identified concerns, would find utility.

SUMMARY

The following is a non-exhaustive list of examples, which may or may not be claimed, of the subject matter according to the present disclosure.

In an example, a disclosed plug gauge includes a housing defining an internal volume and a longitudinal axis $A_H$. The housing includes an opening into the internal volume. The plug gauge also includes a contact element at least partially received in the opening. The plug gauge further includes a plunger at least partially received in the internal volume. The plunger is biased into engagement with the contact element to urge the contact element radially outward from the housing through the opening. The plug gauge additionally includes a sealing member between the contact element and the housing.

In an example, a disclosed method for inhibiting ingress of debris into a plug gauge that includes a housing including an opening, a contact element at least partially received in the opening, and a plunger biased into engagement with the contact element to urge the contact element outward from the housing through the opening, includes a step of placing a sealing member between the contact element and the housing.

Other examples of the disclosed plug gauge and method will become apparent from the following detailed description, the accompanying drawings and the appended claims.

DETAILED DESCRIPTION

The following detailed description refers to the accompanying drawings, which illustrate specific examples described by the present disclosure. Other examples having different structures and operations do not depart from the scope of the present disclosure. Like reference numerals may refer to the same feature, element, or component in the different drawings.

Illustrative, non-exhaustive examples, which may be, but are not necessarily, claimed, of the subject matter according the present disclosure are provided below. Reference herein to "example" means that one or more feature, structure, element, component, characteristic, and/or operational step described in connection with the example is included in at least one embodiment and/or implementation of the subject matter according to the present disclosure. Thus, the phrases "an example," "another example," "one or more examples," and similar language throughout the present disclosure may, but do not necessarily, refer to the same example. Further, the subject matter characterizing any one example may, but does not necessarily, include the subject matter characterizing any other example. Moreover, the subject matter characterizing any one example may be, but is not necessarily, combined with the subject matter characterizing any other example.

Figure 2:
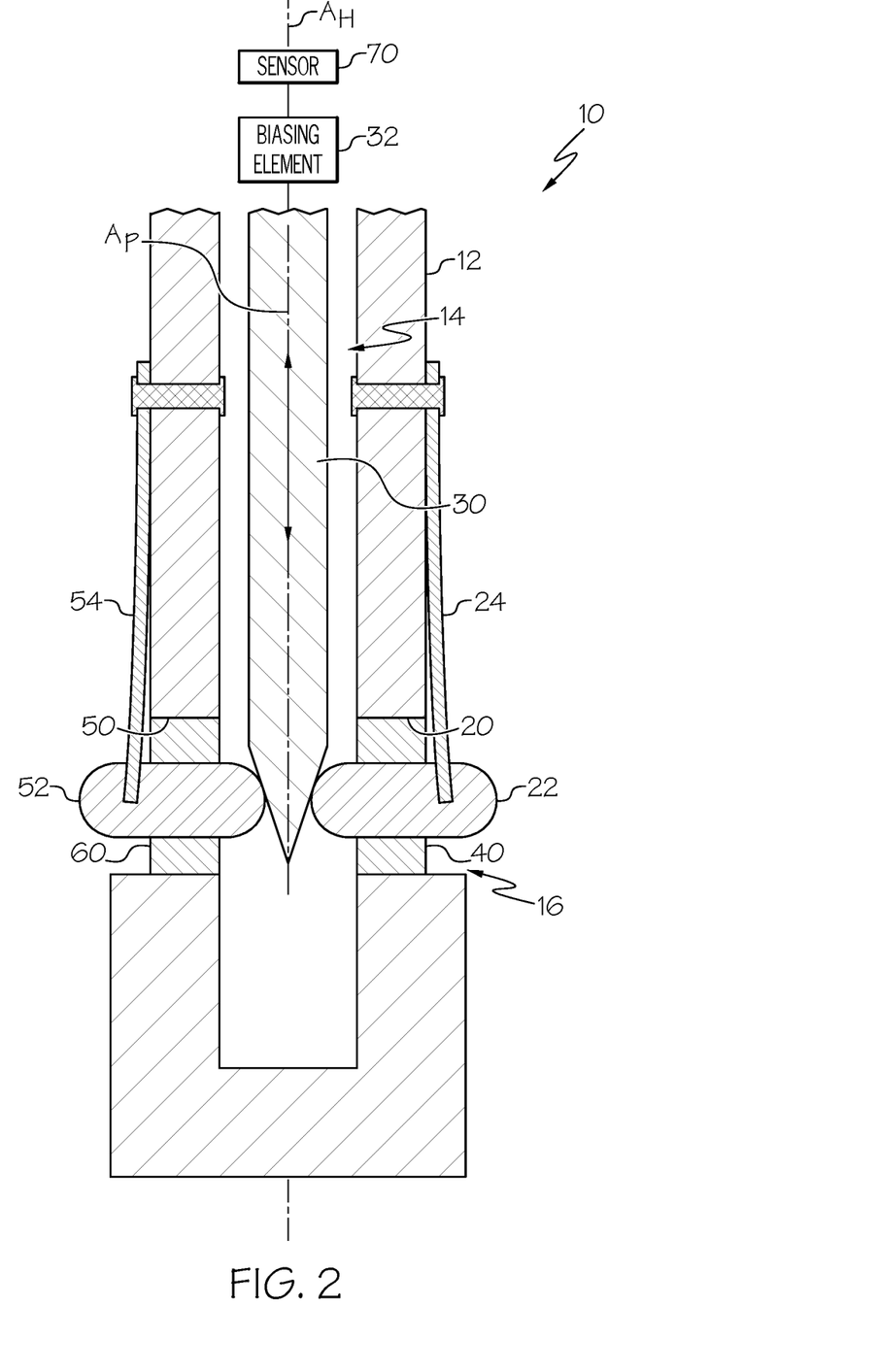
FIG. 2 is a side elevational view, in cross-section, of the sealed plug gauge of FIG. 1.
Figure 3:
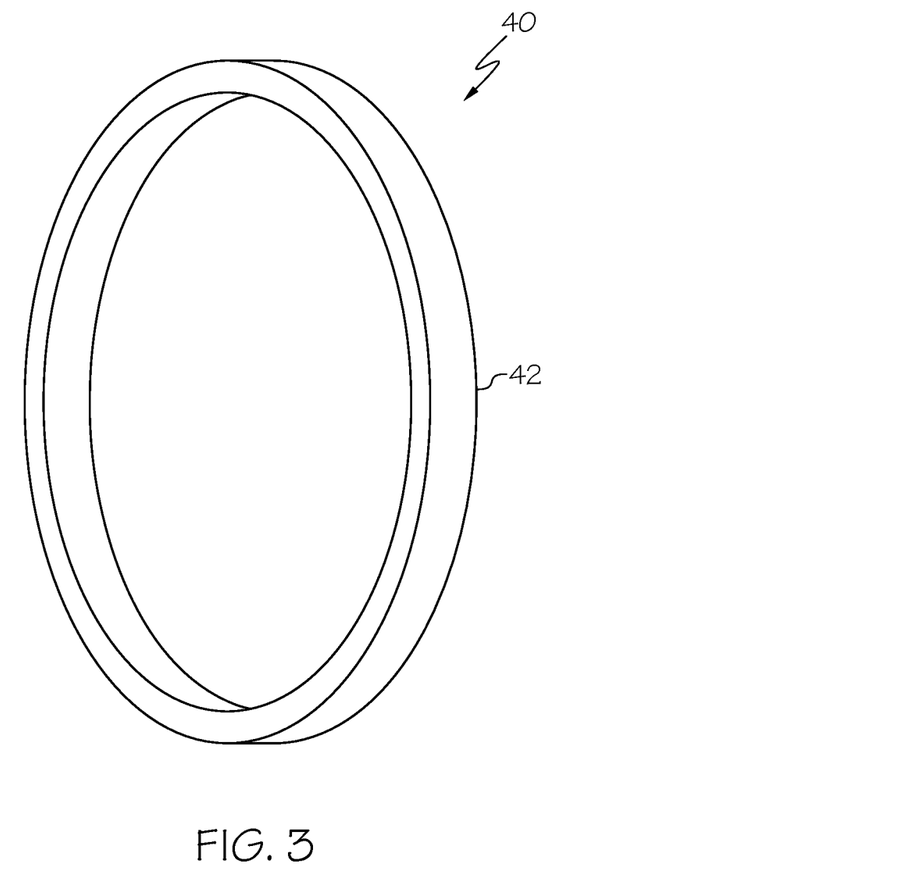
FIG. 3 is a perspective view of one sealing member of the sealed plug gauge of FIG. 2.
Figure 4:
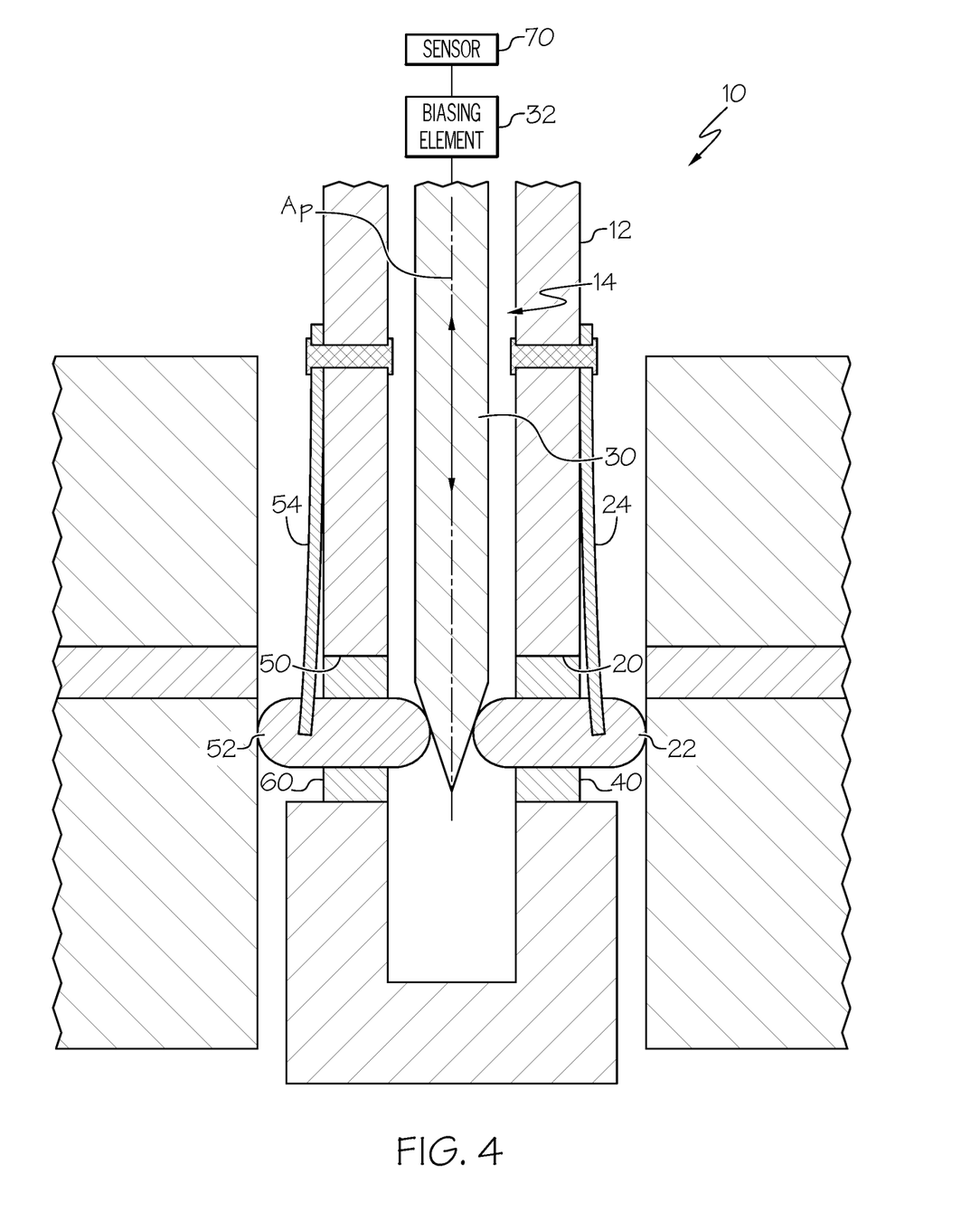
FIG. 4 is a side elevational view, in cross-section, depicting the sealed plug gauge of FIG. 2 inserted into a bore formed in a structure.

Referring to FIGS. 1-8, examples of a plug gauge 10 are disclosed. The plug gauge 10 is configured to be is used to take a measurement of a bore formed in a structure, as illustrated in FIG. 4. The structure may include, or take the form of, any solid body having any shape and dimensions, depending on the particular purpose of the structure. The structure may be made of any one of various suitable materials, such as a metallic material, a plastic material, a composite material, and the like. The structure may be monolithic (a single piece of continuous material) or may be a consolidated laminate of a plurality of material layers. The bore may extend through a portion of or an entirety of a through thickness of the structure. The bore may be formed in the structure by any one of various feature-forming techniques, such as machining (e.g., drilling or boring) or other subtractive manufacturing operations. In some circumstances, debris or other contamination may be located within the bore during measurements taken using the plug gauge 10. In an example, the debris may be solid material left from a machining operation. In another example, the debris may be a viscous or liquid material (e.g., sealant or adhesive) used to bond adjacent material layers.

Referring to FIGS. 1-8, in one or more examples, the plug gauge 10 includes a housing 12 defining an internal volume 14 and a longitudinal axis $A_H$. The housing 12 includes an opening 20 into the internal volume 14. The plug gauge 10 also includes a contact element 22 at least partially received in the opening 20. The plug gauge 10 further includes a plunger 30 at least partially received in the internal volume 14. The plunger 30 is biased into engagement with the contact element 22 to urge the contact element 22 radially outward from the housing 12 through the opening 20. The plug gauge 10 additionally includes a sealing member 40 between the contact element 22 and the housing 12.

As illustrated in FIG. 4, the housing 12 is configured to be inserted at least partially within the bore formed in the structure for the purpose of taking measurements of the bore using the plug gauge. As illustrated in FIGS. 2, 4, 7, and 8, the housing 12 internally houses and protects at least a portion of the various operating components of the plug gauge 10 within the internal volume 14.

As illustrated in FIG. 4, the contact element 22 is configured to engage an interior surface defining the bore when at least a portion of the housing 12 is inserted within the bore. The contact element 22 is moveable within the opening 20 relative to the housing 12. Contact of the contact element 22 with the interior surface defining the bore moves (e.g., pushes) the contact element 22 radially inward along a contact element axis of the contact element 22 through the opening 20. The contact element axis is generally perpendicular to the longitudinal axis $A_H$ of the housing 12.

As illustrated in FIGS. 2 and 4, the plunger 30 defines a plunger axis $A_P$. The plunger axis $A_P$ is aligned with the longitudinal axis $A_H$ of the housing 12. As used herein, the term "aligned," in reference to two or more axes being aligned with each other refers to the two or more axes being parallel to each other or coincident with each other.

As illustrated in FIG. 4, the plunger 30 is movable relative to the housing 12 along the plunger axis $A_P$. The plunger 30 is biased into engagement with the contact element 22 to urge the contact element 22 radially outward through the opening 20. Engagement between the plunger 30 and the contact element 22 urges (e.g., pushes) the contact element 22 radially outward along the contact element axis of the contact element 22 through the opening 20.

The plunger 30 includes, or takes the form of, any suitable reciprocating body configured to move within the housing 12 along the plunger axis $A_P$. As illustrated in FIG. 2, with the plunger 30 biased into engagement with the contact element 22, a portion of the contact element 22 protrudes radially outward from the housing 12 through the opening 20.

As illustrated in FIGS. 2 and 4, the plunger 30 urges the contact element 22 through the opening 20 a sufficient distance so that the contact element 22 is positioned to engage the interior surface defining the bore when the housing 12 is inserted within the bore. As illustrated in FIG. 4, when the housing 12 of the plug gauge 10 is inserted within the bore, engagement with the interior surface defining the bore moves (e.g., pushes) the contact element 22 radially inward through the opening 20 relative to the housing 12. The plunger 30 linearly moves along the plunger axis $A_P$ relative to the housing 12 in response to the radially inward movement of the contact element 22, as depicted by the relative positions of the plunger 30 illustrated in FIGS. 2 and 4.

As illustrated in FIGS. 2 and 4, the sealing member 40 being located between the contact element 22 and the housing 12 at least partially blocks the opening 20 and prevents debris from entering the internal volume 14 of the housing 12 through the opening 20 during use of the plug gauge 10.

Figure 1:
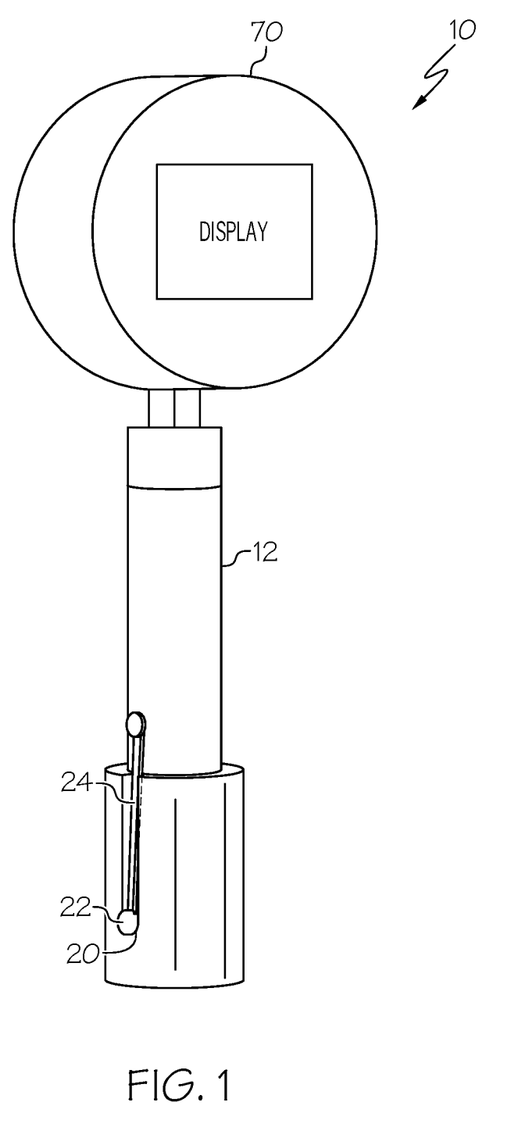
FIG. 1 is a perspective view of one example of the disclosed sealed plug gauge.
Figure 5:
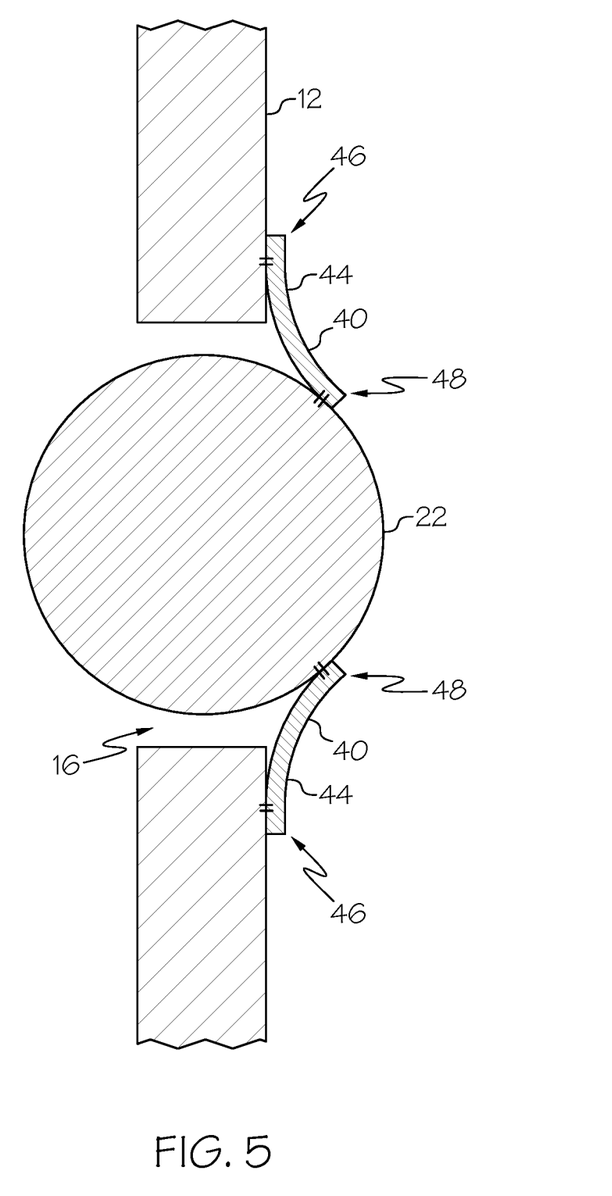
FIG. 5 is a side elevational view, in cross-section, of a portion of another example of the disclosed sealed plug gauge.

Referring generally to FIGS. 1 and 4 and particularly to FIGS. 2 and 5, in one or more examples, a gap 16 is defined between the housing 12 and the contact element 22. At least a portion of the sealing member 40 is in the gap 16. In an example, the gap 16 has a generally annular shape. An area between an annular surface defining the opening 20 and an external annular surface of the contact element 22 forms the gap 16. In an example, the opening 20 is larger than the contact element 22. For example, a cross-sectional dimension (e.g., diameter) of the opening 20, viewed along the contact element axis (e.g., a centerline extending through the opening 20 and the contact element 22 and perpendicular to the longitudinal axis $A_H$ of the housing 12), is larger than a cross-sectional dimension (e.g., diameter) of the contact element 22, viewed along the contact element axis. At least a portion of the sealing member 40 being located in the gap 16 closes off the gap 16.

In one or more examples, the sealing member 40 is packed into the gap 16. For the purpose of the present disclosure, the term "packed" has its ordinary meaning as known to those skilled in the art and refers to the sealing member 40 completely filling the opening 20 or being compressed within the opening 20. In an example, the sealing member 40 has a generally annular shape with an outer dimension (e.g., outer diameter) that is slightly larger than the cross-sectional dimension (e.g., diameter) of the opening 20 and an inner dimension (e.g., inner diameter) that is slightly smaller than the cross-sectional dimension (e.g., diameter) of the contact element 22. In such a configuration, the sealing member 40 forms an interference fit with the contact element 22 and the housing 12. The sealing member being packed into the gap 16 provides a relatively tight seal between the housing 12 and the contact element 22, which is effective to block small particles of debris and/or viscous or liquid debris.

Referring to FIGS. 2, 4, and 5, in one or more examples, the sealing member 40 circumferentially surrounds the contact element 22. The sealing member 40 circumferentially surrounding the contact element 22 provides a complete seal around the contact element 22 and between the contact element 22 and the surface of the housing 12 forming the opening 20. In an example, the contact element 22 is substantially spherical. In another example, the contact element 22 has a generally cylindrical shape with rounded faces or semi-spherical ends. Other suitable shapes of the contact element 22 are also contemplated.

Referring to FIG. 3, in one or more examples, the sealing member 40 is an O-ring 42. The O-ring enables the sealing member 40 to be fixedly connected to at least one of the housing 12 and the contact element 22. The O-ring provides flexibility and durability to the sealing member 40, while effectively blocking solid debris and viscous debris. The O-ring enables formation of an interference fit between the contact element 22 and the housing 12.

Referring to FIGS. 2, 4, and 5, in one or more examples, the sealing member 40 is fixedly connected to at least one of the housing 12 and the contact element 22. The sealing member 40 being fixedly connected to at least one of the housing 12 and the contact element 22 secures the sealing member 40 in place with at least a portion of the sealing member 40 being located in the gap 16 to block debris from entering the internal volume 14 of the housing 12 through the opening 20. As an example, the sealing member 40 being fixedly connected the housing 12 enables the contact element 22 to move through an opening of the sealing member 40 relative to the housing 12.

Figure 6:
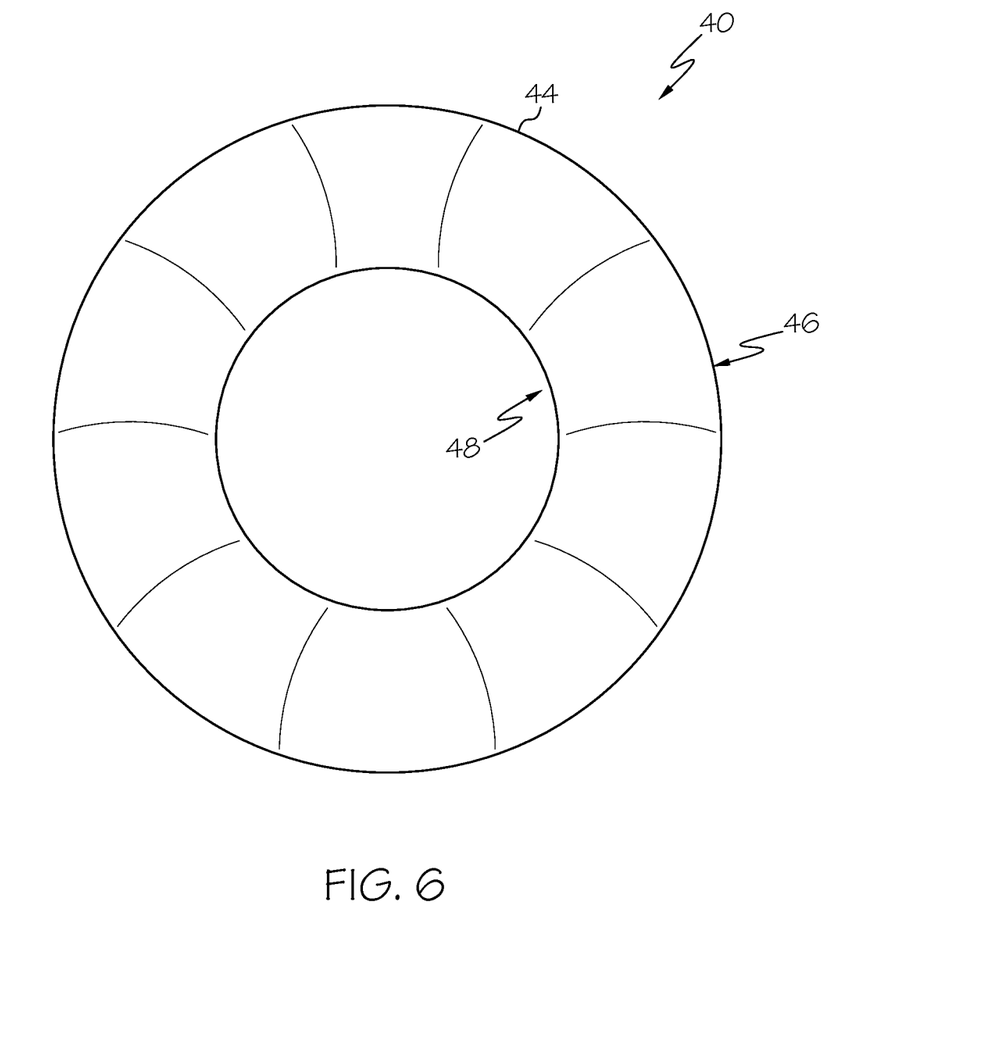
FIG. 6 is an elevational view of an annular diaphragm seal sealing member of the sealed plug gauge of FIG. 5.

Referring to FIGS. 5 and 6, in one or more examples, a first portion 46 of the sealing member 40 is fixedly connected to the housing 12 and a second portion 48 of the sealing member 40 is fixedly connected to the contact element 22. In an example, a first dimension of the first portion 46 (e.g., the outer dimension or diameter of the sealing member 40) is larger than the cross-sectional dimension (e.g., diameter) of the opening 20. A second dimension of the second portion 48 (e.g., the inner dimension or diameter of the sealing member 40) is smaller than the cross-sectional dimension (e.g., diameter) of the contact element 22. The first portion 46 of the sealing member 40 being fixedly connected to the housing 12 and the second portion 48 of the sealing member 40 being fixedly connected to the contact element 22 provides a complete seal around the opening 20, which is effective to block small particles of debris and/or viscous or liquid debris.

Referring to FIGS. 5 and 6, in one or more examples, the sealing member 40 is an annular diaphragm seal 44. The annular diaphragm seal 44 enables the first portion 46 of the sealing member 40 to be fixedly connected to the housing 12 and the second portion 48 of the sealing member 40 to be fixedly connected to the contact element 22, while enabling the contact element 22 to move radially inward and outward through the opening 20 during a bore measuring operation. The annular diaphragm seal 44 provides sufficient flexibility and resiliency to the sealing member 40 for repeated radially inward and outward movement of the contact element 22 without interfering with the radial movement, while effectively blocking solid debris, viscous debris, and liquid debris In an example, the sealing member 40 includes an elastomeric material. The elastomeric material enables the first portion 46 of the sealing member 40 to be fixedly connected to the housing 12 and the second portion 48 of the sealing member 40 to be fixedly connected to the contact element 22, while enabling the contact element 22 to move radially inward and outward through the opening 20 during a bore measuring operation. The elastomeric material provides sufficient flexibility and resiliency to the sealing member 40 for repeated radially inward and outward movement of the contact element 22 without interfering with the radial movement, while effectively blocking solid debris, viscous debris, and liquid debris. In an example, the sealing member 40 includes polytetrafluoroethylene. In an example, the sealing member 40 includes silicone. Other suitable elastomeric materials are also contemplated.

In an example, the sealing member 40 includes a metallic material. The metallic material enables the sealing member 40 to be fixedly connected to one of the housing 12 or the contact element 22. The metallic material provides rigidity and durability to the sealing member 40, while effectively blocking solid debris and viscous debris. In an example, the metallic material includes brass. Other suitable metallic materials are also contemplated.

In an example, the sealing member 40 includes mesh. The mesh enables the sealing member 40 to be fixedly connected to at least one of the housing 12 and the contact element 22. For example, mesh enables the first portion 46 of the sealing member 40 to be fixedly connected to the housing 12 and the second portion 48 of the sealing member 40 to be fixedly connected to the contact element 22, while enabling the contact element 22 to move radially inward and outward through the opening 20 during a bore measuring operation. The mesh provides sufficient flexibility and resiliency to the sealing member 40 for repeated radially inward and outward movement of the contact element 22 without interfering with the radial movement, while effectively blocking solid debris.

Figure 7:
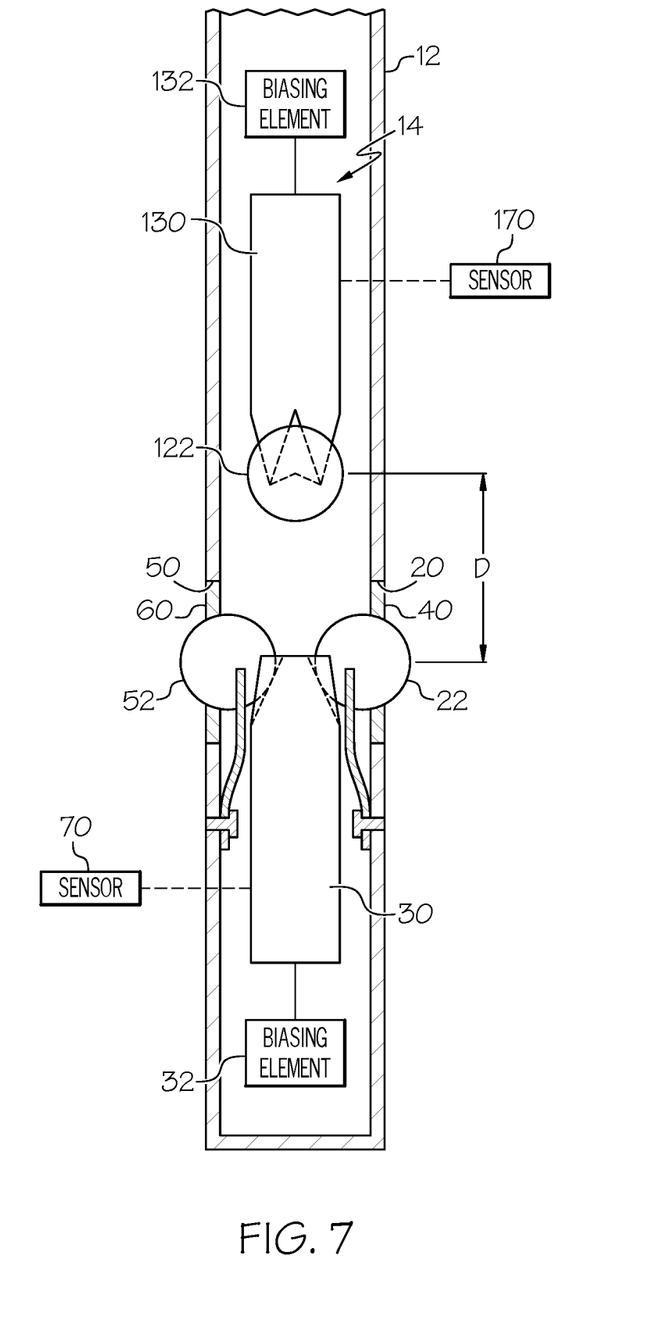
FIG. 7 is a side elevational view, in cross-section, of yet another example of the disclosed sealed plug gauge.

Referring to FIGS. 2, 4, and 7, in one or more examples, the plug gauge 10 includes a second contact element 52 at least partially received in a second opening 50 in the housing 12. The plunger 30 is biased into engagement with the second contact element 52 to urge the second contact element 52 radially outward from the housing 12 through the second opening 50. The plug gauge 10 also includes a second sealing member 60 between the second contact element 52 and the housing 12.

As illustrated in FIG. 4, the second contact element 52 is configured to engage an interior surface defining the bore when the housing 12 is inserted within the bore. The second contact element 52 is moveable within the second opening 50 relative to the housing 12. Contact of the second contact element 52 with the interior surface defining the bore moves (e.g., pushes) the second contact element 52 radially inward along a second contact element axis of the second contact element 52 through the second opening 50. The second contact element axis is generally perpendicular to the longitudinal axis $A_H$ of the housing 12.

The plunger 30 is biased into engagement with the second contact element 52 to urge the second contact element 52 radially outward through the second opening 50. In an example, the plunger 30 is biased into engagement with both of the contact element 22 and the second contact element 52 to urge each of the contact element 22 and the second contact element 52 radially outward through the opening 20 and the second opening 50, respectively.

Although FIG. 5 illustrates an example of the contact element 22, the opening 20, and the sealing member 40, FIG. 5 is also illustrative of an example of the second contact element 52, the second opening 50, and the second sealing member 60. In one or more examples, the second contact element 52 is substantially the same as the contact element 22. In one or more examples, the second opening 50 is substantially the same as the opening 20. In one or more examples, the second sealing member 60 is substantially the same as the sealing member 40.

As illustrated in FIGS. 2 and 4, the plunger 30 urges the second contact element 52 through the second opening 54 a sufficient distance so that the second contact element 52 is positioned to engage the interior surface defining the bore when the housing 12 is inserted within the bore. As illustrated in FIG. 4, when the housing 12 of the plug gauge 10 is inserted within the bore, engagement with the interior surface defining the bore moves (e.g., pushes) the second contact element 52 radially inward through the second opening 50 relative to the housing 12. The plunger 30 linearly moves along the plunger axis $A_P$ relative to the housing 12 in response to the radially inward movement of the second contact element 52, as depicted by the relative positions of the plunger 30 illustrated in FIGS. 2 and 4.

As illustrated in FIGS. 2, 4, and 7, the second sealing member 60 being located between the second contact element 52 and the housing 12 at least partially blocks the second opening 50 and prevents debris from entering the internal volume 14 of the housing 12 through the second opening 50. In one or more examples, a second gap is defined between the housing 12 and the second contact element 52. At least a portion of the second sealing member 60 is in the second gap.

Referring to FIGS. 2, 4, and 7, in one or more examples, the second opening 50 is diametrically opposed from the opening 20. As such, the second contact element 52 is diametrically opposed from the contact element 22 so that the contact element 22 and the second contact element 52 share and move along the same contact element axis, which is generally perpendicular to the longitudinal axis $A_H$.

With the plunger 30 biased into engagement with the contact element 22 and the second contact element 52, a linear distance between diametrically opposed ends of the contact element 22 and the second contact element 52 is greater than the bore-dimension of the bore. When the housing 12 of the plug gauge 10 is inserted within the bore, engagement with the interior surface defining the bore moves (e.g., pushes) the contact element 22 and the second contact element 52 radially inward along the contact element axis through the opening 20 and the second opening 50, respectively, relative to the housing 12. The plunger 30 linearly moves along the plunger axis $A_P$ relative to the housing 12 in response to the radially inward movement of the contact element 22 and the second contact element 52, as depicted by in FIGS. 2 and 4.

Referring to FIGS. 1, 2, 4, and 7, in one or more examples, the contact element 22 is connected to the housing 12 by a retainer 24. Similarly, in one or more example, the second contact element 52 is connected to the housing 12 by a second retainer 54.

In an example, each one of the retainer 24 and the second retainer 54 is located on an exterior of the housing 12 (e.g., is coupled to an external surface of the housing 12), as illustrated in FIGS. 2 and 4. Alternatively, in another example, each one of the retainer 24 and the second retainer 54 is located on an interior of the housing 12 (e.g., is received in the internal volume 14 and is coupled to an internal surface of the housing 12), as illustrated in FIG. 7.

In an example, one end of the retainer 24 is coupled to the housing 12 and an opposing end of the retainer 24 is coupled to the contact element 24. Similarly, one end of the second retainer 54 is coupled to the housing 12 and an opposing end the second retainer 54 is coupled to the second contact element 52. In an example, each one of the retainer 24 and the second retainer 54 is connected to the housing 12 using a respective mechanical fastener, as illustrated in FIGS. 2 and 4.

The retainer 24 connects the contact element 22 to the housing 12 and holds the contact element 22 within the opening 20. The second retainer 54 connects the second contact element 52 to the housing 12 and holds the second contact element 52 within the second opening 50. Each of the retainer 24 and/or the second retainer 54 includes, or takes the form of, any suitable flexible body configured to support a respective one of the contact element 22 and the second contact element 52 within an associated one of the opening 20 and the second opening 50, while allowing radially inward and outward movement of the respective respect one of the contact element 22 and the second contact element 52 through the associated one of the opening 20 and the second opening 50.

Referring to FIGS. 2 and 4, in one or more examples, the plug gauge 10 includes a biasing element 32 positioned to bias the plunger 30 into engagement with the contact element 22 and the second contact element 52. The biasing element 32 is configured to exert a biasing force on the plunger 30 along the plunger axis $A_P$ in a direction toward the contact element 22 and the second contact element 52 so that the plunger 30 urges each of the contact element 22 and the second contact element 52 radially outward through the respective one of the opening 20 and the second opening 50. The biasing force of the biasing element 32 is overcome in response to a radially inward force applied to the contact element 22 and the second contact element 52 by contact with the interior surface defining the bore when the housing 12 is inserted within the bore, which in turn linearly moves the plunger 30 in a direction opposite to the direction of the biasing force.

In an example, the biasing element 32 includes, or takes the form of, a spring. In other examples, the biasing element 32 includes any one of various types of suitable biasing mechanisms. In an example, the biasing element 32 is positioned in the internal volume 14 of the housing 12. In another example, the biasing element 32 is positioned outside of the housing 12.

Figure 8:
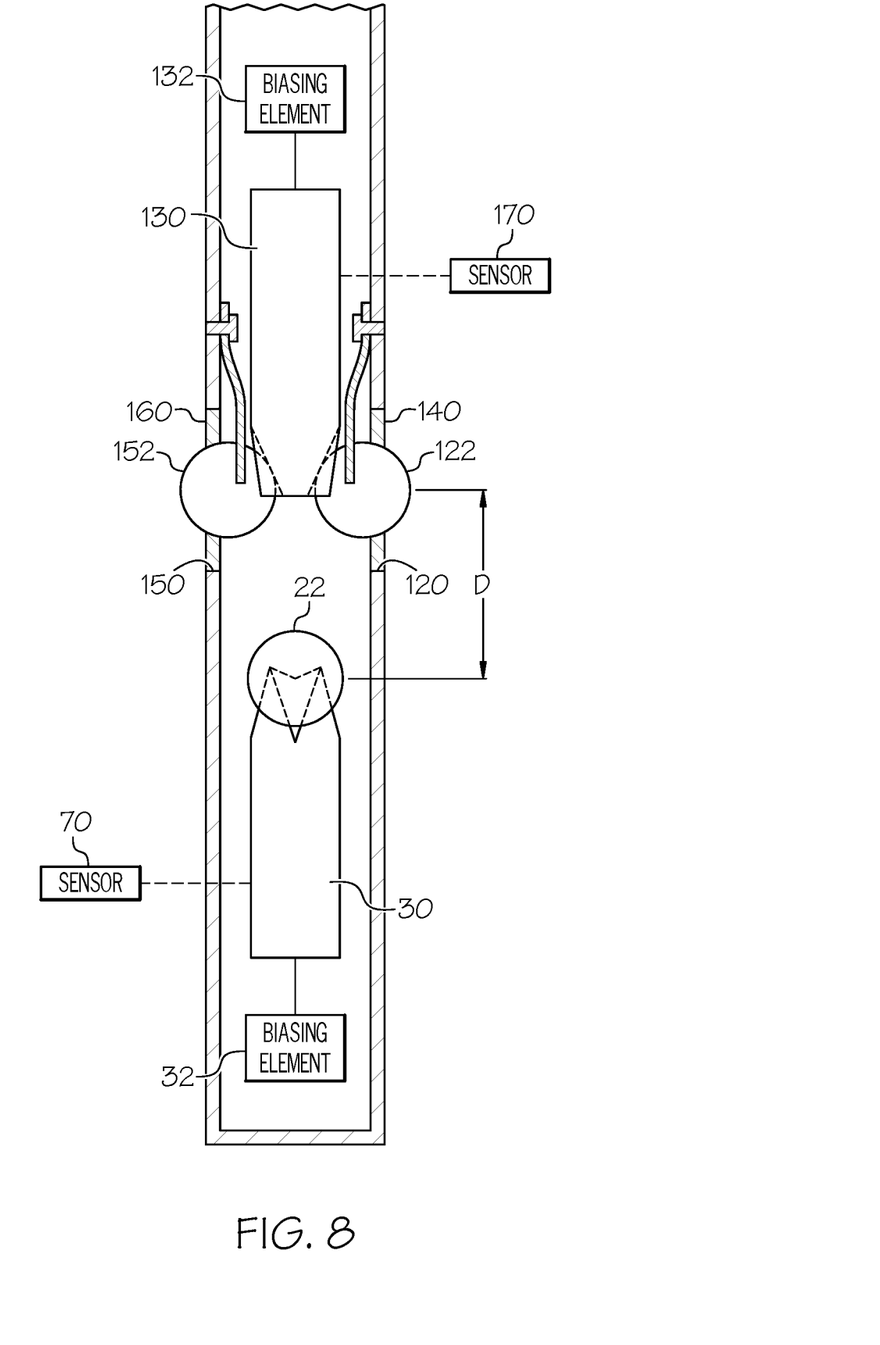
FIG. 8 is a side elevational view, in cross-section, of the sealed plug gauge of FIG. 7 shown rotated ninety degrees from the orientation shown in FIG. 7.

Referring to FIGS. 7 and 8, in one or more examples, the plug gauge 10 includes a second set of contact elements 122, 152. Each contact element 122, 152 of the second set of contact elements 122, 152 is received in a corresponding opening 120, 150 of a second set of openings 120, 150 in the housing 12.

In one or more examples, each opening 120, 150 of a second set of openings 120, 150 is diametrically opposed from the other. As such, each contact element 122, 152 of the second set of contact elements 122, 152 is diametrically opposed from the other so that the second set of contact elements 122, 152 share and move along the same second contact element axis, which is generally perpendicular to the longitudinal axis $A_H$.

The second set of contact elements 122, 152 is configured to engage the interior surface defining the bore when at least a portion of the housing 12 is inserted within the bore. Each contact element 122, 152 of the second set of contact elements 122, 152 is moveable within the opening 20 relative to the housing 12. Contact of the second set of contact elements 122, 152 with the interior surface defining the bore moves (e.g., pushes) each contact element 122, 152 of the second set of contact elements 122, 152 radially inward along the second contact element axis through the corresponding opening 120, 150 of a second set of openings 120, 150.

As illustrated in FIG. 8, in one or more examples, the plug gauge 10 includes a second plunger 130 at least partially received in the internal volume 14. The second plunger 130 is biased into engagement with the second set of contact elements 122, 152 to urge each contact element 122, 152 of the second set of contact elements 122, 152 radially outward from the housing 12 through the corresponding opening 120, 150 of a second set of openings 120, 150.

In one or more examples, the plug gauge 10 includes a second biasing element 132 positioned to bias the second plunger 130 into engagement with the second set of contact elements 122, 152. The second biasing element 132 is configured to exert a biasing force on the second plunger 130 along a second plunger axis in a direction toward the second set of contact elements 122, 152 so that the second plunger 130 urges each contact element 122, 152 of the second set of contact elements 122, 152 radially outward through the corresponding opening 120, 150 of a second set of openings 120, 150. The biasing force of the second biasing element 132 is overcome in response to a radially inward force applied to the second set of contact elements 122, 152 by contact with the interior surface defining the bore when the housing 12 is inserted within the bore, which in turn linearly moves the second plunger 130 in a direction opposite to the direction of the biasing force.

As illustrated in FIG. 8, in one or more examples, the plug gauge 10 includes a second set of sealing members 140, 160. Each sealing member 140, 160 of the second set of sealing members 140, 160 is located between a respective one of the second set of contact elements 122, 152 and the housing 12. Each sealing member 140, 160 of the second set of sealing members 140, 160 being located between the respective one of the second set of contact elements 122, 152 and the housing 12 at least partially blocks the corresponding opening 120, 150 of a second set of openings 120, 150 and prevents debris from entering the internal volume 14 of the housing 12 through the second set of openings 120, 150 during use of the plug gauge 10.

As illustrated in FIG. 8, in one or more examples, each contact element 122, 152 of the second set of contact elements 122, 152 is connected to the housing 12 by a respective retainer of a second set of retainers.

Generally, each contact element 122, 152 of the second set of contact elements 122, 152 illustrated in FIGS. 7 and 8 is substantially the same in structure and operation as the contact element 22 and the second contact element 52 described herein and illustrated in FIGS. 1-7. Similarly, each opening 120, 150 of the second set of openings 120, 150 illustrated in FIGS. 7 and 8 is substantially the same in structure and operation as the opening 20 and the second opening 50 described herein and illustrated in FIGS. 1-7. The second plunger 130 and second biasing element 132 illustrated in FIGS. 7 and 8 are substantially the same in structure and operation as the plunger 30 and the biasing element 32 described herein and illustrated in FIGS. 1-7. Each retainer of the second set of retainers illustrated in Fig. and 8 is substantially the same in structure and operation as retainer 24 and second retainer 54 described herein and illustrated in FIGS. 1-7.

Examples of the plug gauge 10, as illustrated in FIGS. 7 and 8, are configured to be used to take multiple simultaneous diametric measurements of the bore formed in the structure.

Referring to FIGS. 7 and 8, in one or more examples, the second set of openings 120, 150 is longitudinally displaced a non-zero distance D from the opening 20 and the second opening 50 along the longitudinal axis $A_H$. Similarly, the second set of contact elements 122, 152 is longitudinally displaced the pre-defined non-zero distance D along the longitudinal axis $A_H$ from the contact element 22 and the second contact element 52. The displacement distance D between the second set of openings 120, 150 and the opening 20 and the second opening 50 (and between the second set of contact elements 122, 152 and the contact element 22 and the second contact element 52) enables simultaneous diametric measurements of the bore to be taken at a plurality (e.g., two) different linear measurement locations of the bore along a longitudinal-central axis of the bore. The linear measurement locations are linearly spaced apart by a distance substantially equal to the displacement distance D.

In one or more examples, the second set of openings 120, 150 is angularly displaced from the opening 20 and the second opening 50 about the longitudinal axis $A_H$. Similarly, the second set of contact elements 122, 152 is angularly displaced from the contact element 22 and the second contact element 52 about the longitudinal axis $A_H$. The displacement angle between the second set of openings 120, 150 is angularly displaced from the opening 20 and the second opening 50 (and between the second set of contact elements 122, 152 and the contact element 22 and the second contact element 52) enables simultaneous diametric measurements of the bore to be taken at a plurality (e.g., two) different angular measurement locations of the bore along a circumference of the bore. The angular measurement locations are angularly spaced apart by a non-zero angle substantially equal to the displacement angle. In an example, the non-zero displacement angle is about 90 degrees.

Referring to FIGS. 2, 4, 7, and 8, in one or more examples, the plug gauge 10 includes a sensor 70 sensing movement of the plunger 30 relative to the housing 12. In one or more examples, the sensor 70 is configured to alternatively or additionally sense movement of the contact element 22 and the second contact element 52 relative to the housing 12.

The sensor 70 includes any one of various devices capable of directly or indirectly detecting relative movement of the plunger 30, a change in relative linear location of the plunger 30 along the plunger axis $A_P$, movement of the contact element 22 and the second contact element 52, or a change in relative radial location of the contact element 22 and the second contact element 52. The sensor 70 measures a physical quantity associated with movement of the plunger 30 and/or movement of the contact element 22 and the second contact element 52 and converts the measurement into a signal that can be read by an observer or by an instrument. The signal generated by the sensor 70 corresponds to the bore-dimension of the bore at a given location of the contact element 22 and the second contact element 52 along the longitudinal-central axis of the bore.

Referring to FIGS. 7 and 8, in one or more examples, the plug gauge 10 includes a second sensor 170 sensing movement of the second plunger 130 relative to the housing 12. In one or more examples, the second sensor 170 is configured to alternatively or additionally sense movement of the second set of contact elements 122, 152 relative to the housing 12.

The second sensor 170 includes any one of various devices capable of directly or indirectly detecting relative movement of the second plunger 130, a change in relative linear location of the second plunger 130 along the second plunger axis, movement of the second set of contact elements 122, 152, or a change in relative radial location of the second set of contact elements 122, 152. The second sensor 170 measures a physical quantity associated with movement of the second plunger 130 and/or movement of the second set of contact elements 122, 152 and converts the measurement into a signal that can be read by an observer or by an instrument. The signal generated by the second sensor 170 corresponds to the bore-dimension of the bore at a given location of the second set of contact elements 122, 152 along the longitudinal-central axis of the bore.

In an example, the sensor 70 and the second sensor 170 are the same type of sensor device. In another example, the sensor 70 and the second sensor 170 are different types of sensor devices. In an example, at least one of the sensor 70 and the second sensor 170 include a dial gauge, a linear position sensor, a linear potentiometer, linear variable differential transformer, linear encoder, an optical linear encoder, and a strain gauge.

Referring to FIGS. 1, 2, 4, 7, and 8, in one or more examples, the sensor 70 is located outside of the housing 12. Alternatively, in one or more example, the sensor 70 is located inside of the housing 12 (e.g., received in the internal volume 14).

Referring to FIGS. 7 and 8, in one or more examples, the second sensor 170 is located outside of the housing 12.

Alternatively, in one or more example, the second sensor 170 is located inside of the housing 12 (e.g., received in the internal volume 14).

Figure 9:
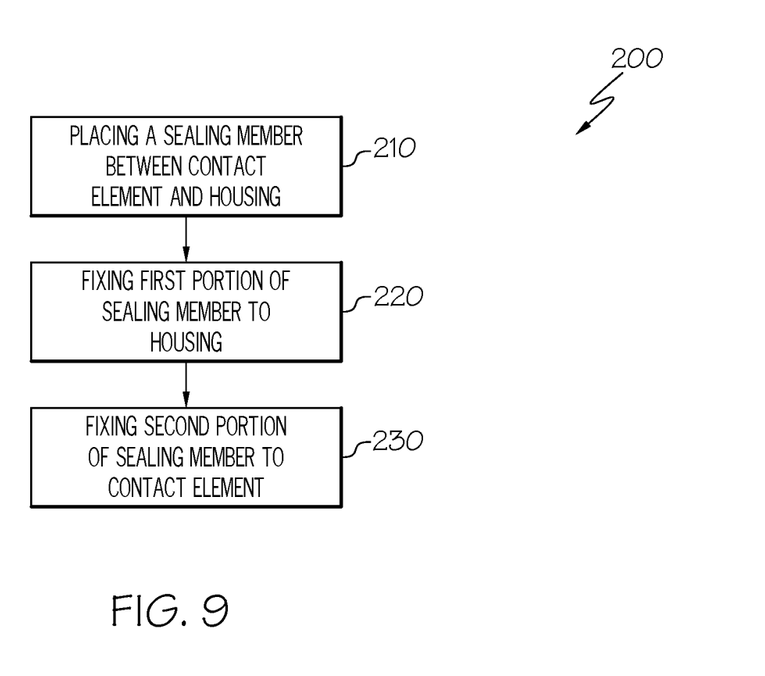
FIG. 9 is a flow diagram depicting one example of the disclosed method for sealing a plug gauge.

Referring generally to FIGS. 1-8 and particularly to FIG. 9, examples of a method 200 for inhibiting ingress of debris into the plug gauge 10 are disclosed. In one or more examples, the plug gauge 10 (FIGS. 1-8) includes the housing 12 including the opening 20, the contact element 22 at least partially received in the opening 20, and the plunger 30 biased into engagement with the contact element 22 to urge the contact element 22 outward from the housing 12 through the opening 20.

Referring to FIG. 9, in one or more examples, the method 200 includes a step of (block 210) placing the sealing member 40 between the contact element 22 and the housing 12. In an example, the step of (block 210) placing the sealing member 40 between the contact element 22 and the housing 12 includes packing the sealing member 40 into the gap 16 (FIG. 2). In an example, the step of (block 210) placing the sealing member 40 between the contact element 22 and the housing 12 includes circumferentially surrounding the contact element 22 with the sealing member 40. Placing the sealing member 40 between the contact element 22 and the housing 12 closes off the gap 16 and prevents debris from entering the internal volume 14 of the housing 12 through the opening 20 during use of the plug gauge 10 for taking measurement of the bore.

In one or more example, the method 200 includes a step of fixedly connecting the sealing member 40 to at least one of the housing 12 and the contact element 22. Referring to FIG. 9, in one or more examples, the method 200 includes a step of (block 220) fixing the first portion 46 FIGS. 5 and 6) of the sealing member 40 to the housing 12. In one or more examples, the method 200 includes a step of (block 230) fixing the second portion 48 (FIGS. 5 and 6) of the sealing member 40 to the contact element 22.

Referring to FIG. 9, according to the method 200, in one or more examples, the step of (block 220) fixing the first portion 46 of the sealing member 40 to the housing 12 includes at least one of welding, adhering, and brazing. According to the method 200, in one or more examples, the step of (block 230) fixing the second portion 48 of the sealing member 40 to the contact element 22 includes at least one of welding, adhering, and brazing. The welding operation may include any suitable material welding technique. The adhering step may include any suitable adhesive bonding technique. The brazing step may include any suitable brazing technique.

In accordance with the method 200, the operations described above with respect to the sealing member 40, the contact element 22, and the housing 12 for inhibiting ingress of debris into the plug gauge 10 are substantially the same as additional operations with respect to the second sealing member 60, the second contact element 52, the second set of sealing members 140, 160, the second set of contact elements 122, 152, and the housing 12 for inhibiting ingress of debris into the plug gauge 10.

Figure 10:
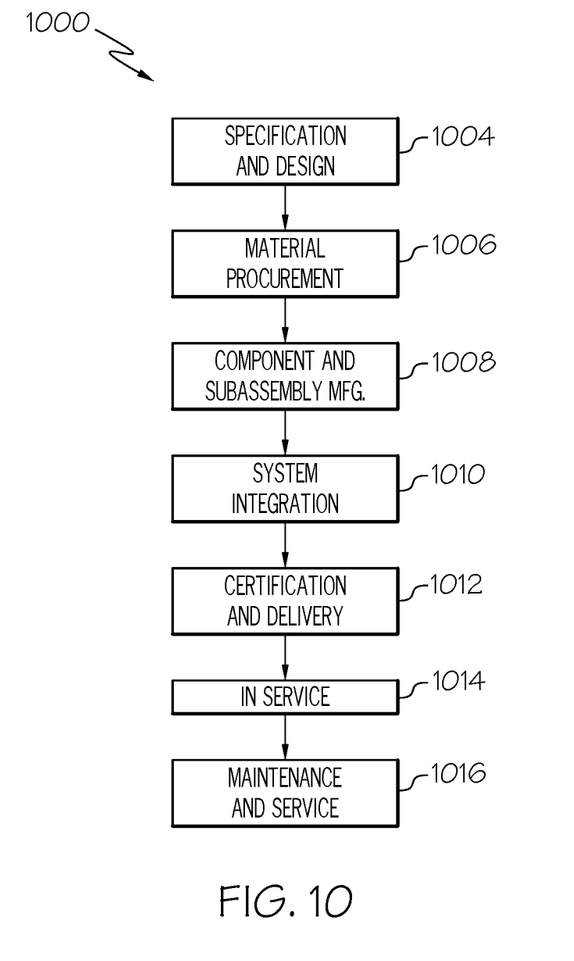
FIG. 10 is a flow diagram of an aircraft manufacturing and service methodology.
Figure 11:
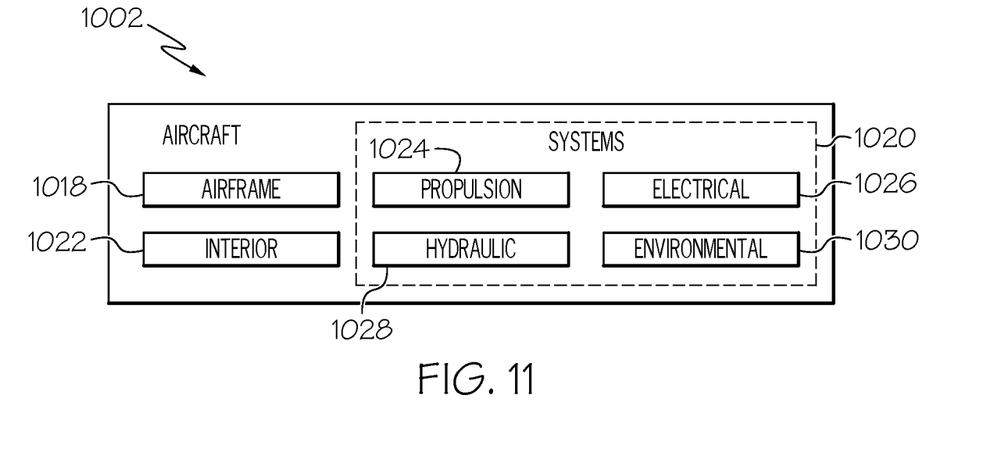
FIG. 11 is a block diagram of an aircraft.

Examples of the plug gauge 10 and the method 200 disclosed herein may find use in a variety of potential applications, particularly in the transportation industry, including for example, aerospace applications. Referring now to FIGS. 10 and 11, examples of the plug gauge 10 and the method 200 may be used in the context of an aircraft manufacturing and service method 1000, as shown in the flow diagram of FIG. 10 and an aircraft 1002, as shown in FIG. 11. Aircraft applications may include taking measurements, such as multiple simultaneous diametric measurements, of a bore formed in a structure or other component used in the manufacture of aircraft using the plug gauge 10 and/or the method 200, while inhibiting ingress of debris into the internal volume 14 of the housing 12 of the plug gauge 10.

FIG. 11 is an illustrative example of the aircraft 1002. The aircraft 1002 includes an airframe 1018, a plurality of high-level systems 1020, and an interior 1022. Examples of the high-level systems 1020 include one or more of a propulsion system 1024, an electrical system 1026, a hydraulic system 1028, and an environmental system 1030. In other examples, the aircraft 1002 may include any number of other types of systems.

The aircraft 1002 illustrated in FIG. 11 is an example of an aircraft having one or more structures or components that include any number of bores, for example, used for fastening purposes, which may be measured using the plug gauge 10 and/or the method 200 disclosed herein. In an example, the structure is a component of the aircraft 1002 or is an element of a larger assembly of the aircraft 1002. In an example, the structure forms a part of the airframe 1018 of the aircraft 1002, such as a fuselage, a wing, a vertical stabilizer, a horizontal stabilizer, another structure of the aircraft 1002, such as a skin panel, a stringer, a spar, a rib, a wing box, a stiffener, or a part of the interior 1022, such as an interior panel.

As illustrated in FIG. 10, during pre-production, the method 1000 may include specification and design of aircraft 1002 (block 1004) and material procurement (block 1006). During production of the aircraft 1002, component and subassembly manufacturing (block 1008) and system integration (block 1010) of the aircraft 1002 may take place. Thereafter, the aircraft 1002 may go through certification and delivery (block 1012) to be placed in service (block 1014). Implementation of the plug gauge 10 and the method 200 may form a portion of component and subassembly manufacturing (block 1008) and/or system integration (block 1010). Routine maintenance and service (block 1016) may include modification, reconfiguration, refurbishment, etc. of one or more systems of the aircraft 1002.

Each of the processes of the method 1000 illustrated in FIG. 10 may be performed or carried out by a system integrator, a third party, and/or an operator (e.g., a customer). For the purposes of this description, a system integrator may include, without limitation, any number of aircraft manufacturers and major-system subcontractors; a third party may include, without limitation, any number of vendors, subcontractors, and suppliers; and an operator may be an airline, leasing company, military entity, service organization, and so on.

Examples of the plug gauge 10 and the method 200 shown or described herein may be employed during any one or more of the stages of the manufacturing and service method 1000 shown in the flow diagram illustrated by FIG. 10. For example, components or subassemblies, such as those that include the structure having any number of bores, corresponding to component and subassembly manufacturing (block 1008) may be fabricated or manufactured in a manner similar to components or subassemblies produced while the aircraft 1002 (FIG. 11) is in service (block 1014). Also, one or more examples of the plug gauge 10 and the method 200 described herein may be utilized during production stages (block 1010 and block 1012). Similarly, one or more examples of the plug gauge 10 and the method 200 described herein may be utilized, for example and without limitation, while the aircraft 1002 is in service (block 1014) and during maintenance and service (block 1016).

Although an aerospace example is shown, the examples and principles disclosed herein may be applied to other industries, such as the automotive industry, the space industry, the construction industry, and other design and manufacturing industries. Accordingly, in addition to aircraft, the examples and principles disclosed herein may apply to other vehicle structures (e.g., land vehicles, marine vehicles, space vehicles, etc.) and stand-alone structures.

As used herein, a system, apparatus, device, structure, article, element, component, or hardware "configured to" perform a specified function is indeed capable of performing the specified function without any alteration, rather than merely having potential to perform the specified function after further modification. In other words, the system, apparatus, device, structure, article, element, component, or hardware "configured to" perform a specified function is specifically selected, created, implemented, utilized, programmed, and/or designed for the purpose of performing the specified function. As used herein, "configured to" denotes existing characteristics of a system, apparatus, structure, article, element, component, or hardware that enable the system, apparatus, structure, article, element, component, or hardware to perform the specified function without further modification. For purposes of this disclosure, a system, apparatus, device, structure, article, element, component, or hardware described as being "configured to" perform a particular function may additionally or alternatively be described as being "adapted to" and/or as being "operative to" perform that function.

Unless otherwise indicated, the terms "first", "second", etc. are used herein merely as labels, and are not intended to impose ordinal, positional, or hierarchical requirements on the items to which these terms refer. Moreover, reference to a "second" item does not require or preclude the existence of lower-numbered item (e.g., a "first" item) and/or a higher-numbered item (e.g., a "third" item).

For the purpose of this disclosure, the terms "coupled," "coupling," and similar terms refer to two or more elements that are joined, linked, fastened, connected, put in communication, or otherwise associated (e.g., mechanically, electrically, fluidly, optically, electromagnetically) with one another. In various examples, the elements may be associated directly or indirectly. As an example, element A may be directly associated with element B. As another example, element A may be indirectly associated with element B, for example, via another element C. It will be understood that not all associations among the various disclosed elements are necessarily represented. Accordingly, couplings other than those depicted in the figures may also exist.

As used herein, the phrase "at least one of", when used with a list of items, means different combinations of one or more of the listed items may be used and only one of each item in the list may be needed. For example, "at least one of item A, item B, and item C" may include, without limitation, item A or item A and item B. This example also may include item A, item B, and item C, or item B and item C. In other examples, "at least one of" may be, for example, without limitation, two of item A, one of item B, and ten of item C; four of item B and seven of item C; and other suitable combinations.

As used herein, the terms "approximately," "about," and "generally" refer to or represent a condition that is close to, but not exactly, the stated condition that still performs the desired function or achieves the desired result. As an example, the terms "approximately," "about," and "generally" refer to a condition that is within an acceptable predetermined tolerance or accuracy. For example, the terms "approximately," "about," and "generally" refer to a condition that is within 10% of the stated condition. However, the terms "approximately," "about," and "generally" do not exclude a condition that is exactly the stated condition. As used herein, the term "substantially" refers to or represents a condition that is the same as the stated condition to an extent that it may be perceived as being exact. For example, the term "substantially" encompasses conditions that are exactly the same or that are within a predetermined allowable variance, such as within +/−5%, +/−2%, or +/−1%.

Unless otherwise explicitly stated, the schematic illustrations of examples depicted in FIGS. 1-8, referred to above, are not meant to imply structural limitations with respect to the illustrative example. Rather, although one illustrative structure is indicated, it is to be understood that the structure may be modified when appropriate. In FIGS. 2, 4, 7, and 8, referred to above, the blocks may represent functional elements, features, or components thereof and lines connecting the various blocks do not imply any particular structure. Dashed lines, if any, connecting the various blocks represent alternative configurations. Accordingly, modifications, additions and/or omissions may be made to the illustrated structure. Additionally, those skilled in the art will appreciate that not all elements described and illustrated herein need be included in every example and not all elements described herein are necessarily depicted in each illustrative example.

In FIGS. 9 and 10, referred to above, the blocks may represent operations, steps, and/or portions thereof and lines connecting the various blocks do not imply any particular order or dependency of the operations or portions thereof. Blocks represented by dashed lines, if any, indicate alternative operations and/or portions thereof. Dashed lines, if any, connecting the various blocks represent alternative dependencies of the operations or portions thereof. It will be understood that not all dependencies among the various disclosed operations are necessarily represented. FIGS. 9 and 10 and the accompanying disclosure describing the operations of the disclosed methods set forth herein should not be interpreted as necessarily determining a sequence in which the operations are to be performed. Rather, although one illustrative order is indicated, it is to be understood that the sequence of the operations may be modified when appropriate. Accordingly, modifications, additions and/or omissions may be made to the operations illustrated and certain operations may be performed in a different order or simultaneously. Additionally, those skilled in the art will appreciate that not all operations described need be performed.

Further, references throughout the present specification to features, advantages, or similar language used herein do not imply that all of the features and advantages that may be realized with the examples disclosed herein should be, or are in, any single example. Rather, language referring to the features and advantages is understood to mean that a specific feature, advantage, or characteristic described in connection with an example is included in at least one example. Thus, discussion of features, advantages, and similar language used throughout the present disclosure may, but do not necessarily, refer to the same example.

The described features, advantages, and characteristics of one example may be combined in any suitable manner in one or more other examples. One skilled in the relevant art will recognize that the examples described herein may be practiced without one or more of the specific features or advantages of a particular example. In other instances, additional features and advantages may be recognized in certain examples that may not be present in all examples. Further-more, although various examples of the plug gauge 10 and the method 200 have been shown and described, modifications may occur to those skilled in the art upon reading the specification. The present application includes such modifications and is limited only by the scope of the claims.

What is claimed is:

1. A plug gauge comprising:
   a housing defining an internal volume and a longitudinal axis $A_H$, said housing comprising an opening into said internal volume;
   a contact element at least partially received in said opening;
   a plunger at least partially received in said internal volume, said plunger being biased into engagement with said contact element to urge said contact element radially outward from said housing through said opening; and
   a sealing member between said contact element and said housing.

2. The plug gauge of claim 1 wherein a gap is defined between said housing and said contact element, and wherein at least a portion of said sealing member is in said gap.

3. The plug gauge of claim 1 wherein a gap is defined between said housing and said contact element, and wherein said sealing member is packed into said gap.

4. The plug gauge of claim 1 wherein said sealing member circumferentially surrounds said contact element.

5. The plug gauge of claim 1 wherein said sealing member is an O-ring.

6. The plug gauge of claim 1 wherein said sealing member is fixedly connected to at least one of said housing and said contact element.

7. The plug gauge of claim 1 wherein a first portion of said sealing member is fixedly connected to said housing and a second portion of said sealing member is fixedly connected to said contact element.

8. The plug gauge of claim 1 wherein said sealing member is an annular diaphragm seal.

9. The plug gauge of claim 1 wherein said sealing member comprises an elastomeric material.

10. The plug gauge of claim 1 wherein said sealing member comprises polytetrafluoroethylene.

11. The plug gauge of claim 1 wherein said sealing member comprises a metallic material.

12. The plug gauge of claim 11 wherein said metallic material comprises brass.

13. The plug gauge of claim 1 wherein said sealing member comprises mesh.

14. The plug gauge of claim 1 further comprising:
    a second contact element at least partially received in a second opening in said housing, wherein said plunger is biased into engagement with said second contact element to urge said second contact element radially outward from said housing through said second opening; and
    a second sealing member between said second contact element and said housing.

15. The plug gauge of claim 14 wherein said second opening is diametrically opposed from said opening.

16. The plug gauge of claim 14 further comprising a second set of contact elements, each contact element, of said second set of contact elements, being received in a corresponding opening, of a second set of openings, in said housing.

17. A method for inhibiting ingress of debris into a plug gauge comprising a housing comprising an opening, a contact element at least partially received in said opening, and a plunger biased into engagement with said contact element to urge said contact element outward from said housing through said opening, said method comprising:
    placing a sealing member between said contact element and said housing.

18. The method of claim 17 further comprising fixing a first portion of said sealing member to said housing.

19. The method of claim 18 further comprising fixing a second portion of said sealing member to said contact element.

20. The method of claim 18 wherein said fixing comprising at least one of welding, adhering, and brazing.

* * * * *